Figure 1:
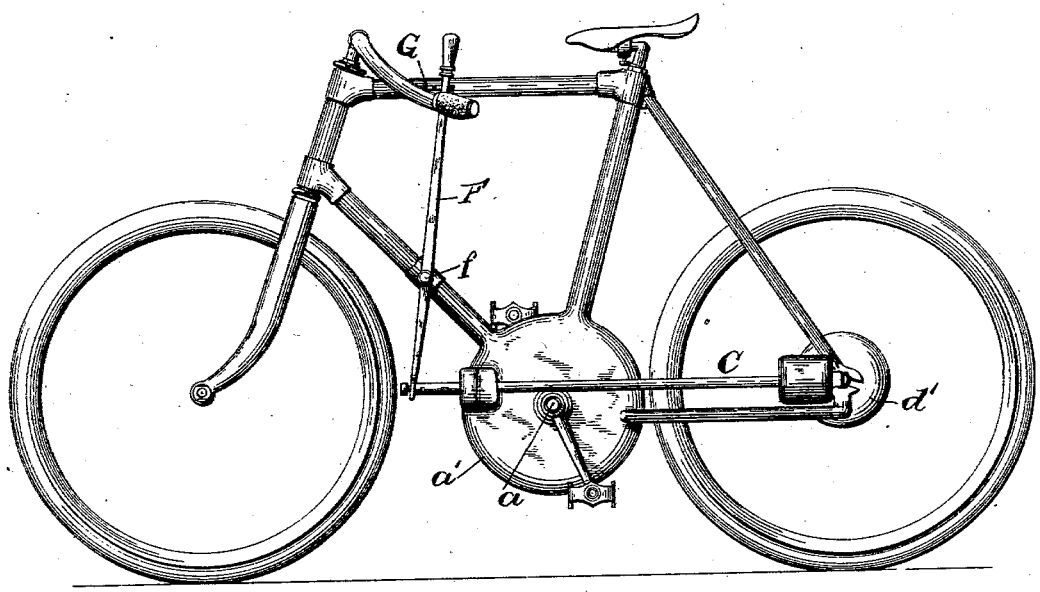

No. 715,404. Patented Dec. 9, 1902.
F. MARKGRAF.
VARIABLE SPEED GEAR FOR VEHICLES.
(Application filed Nov. 11, 1901.)

(No Model.) 2 Sheets—Sheet I.

WITNESSES:
Harry G. Walton
Hugo Boepple Jr.

INVENTOR
Franz Markgraf
BY
ATTORNEY

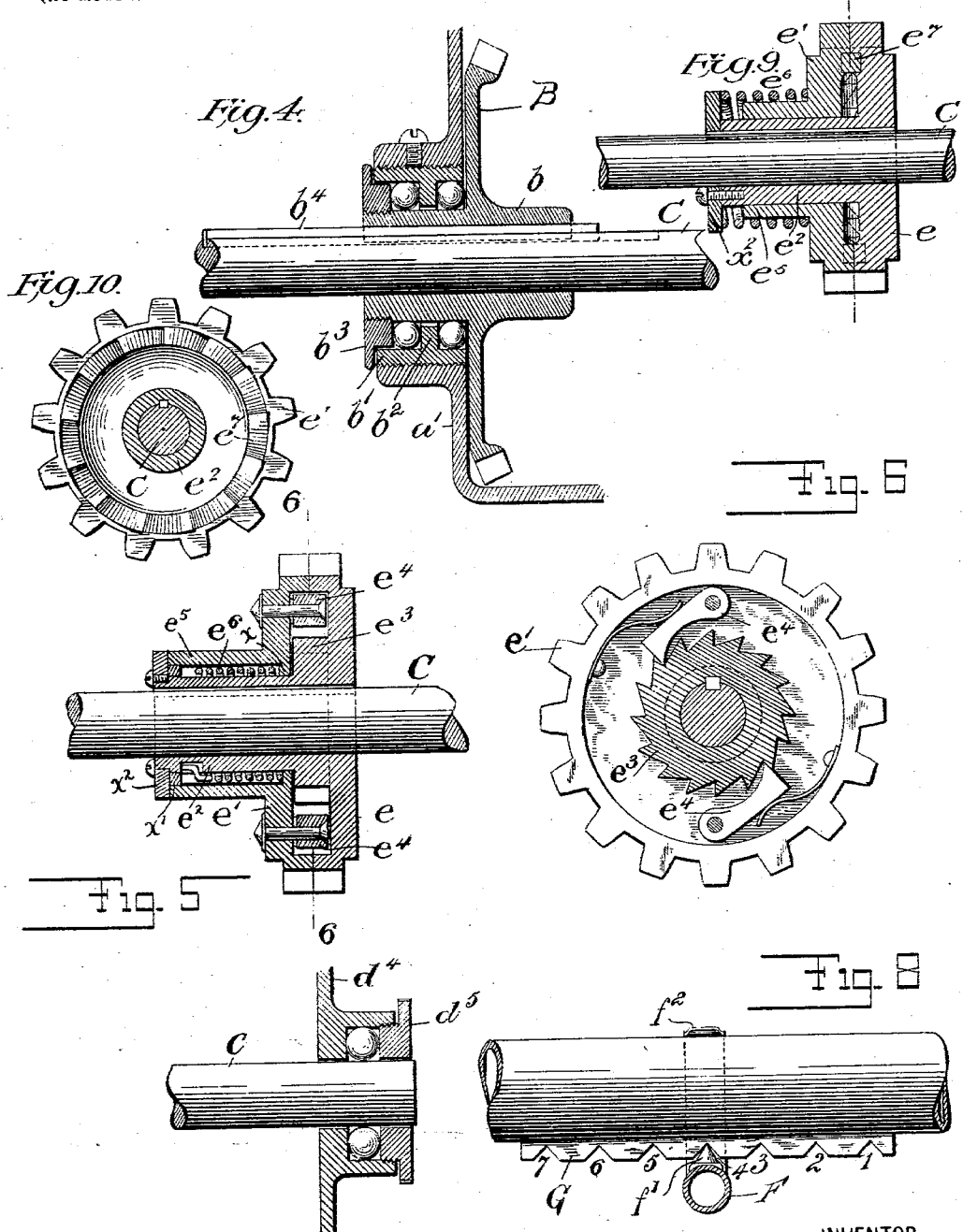

UNITED STATES PATENT OFFICE.

FRANZ MARKGRAF, OF NEW YORK, N. Y.

VARIABLE-SPEED GEAR FOR VEHICLES.

SPECIFICATION forming part of Letters Patent No. 715,404, dated December 9, 1902.

Application filed November 11, 1901. Serial No. 81,786. (No model.)

*To all whom it may concern:*

Be it known that I, FRANZ MARKGRAF, a citizen of the United States, residing in the borough of the Bronx, in the city of New York, county and State of New York, have invented a certain new and useful Improvement in Variable-Speed Gear for Vehicles, of which the following is a specification.

In variable-speed gears as heretofore designed for bicycles, automobiles, &c., in which an intermediate pinion is shifted into mesh with gear-wheels of different diameters to obtain different speeds at the driven gear of shaft, it is difficult to shift the pinion into mesh with gears of different diameters without injuring the teeth of the pinion and gear-wheels. To overcome this objection, various contrivances have been proposed for carrying the pinion from one gear-wheel to another without bringing the apparatus to rest; but so far as I am aware no device has yet been produced which will enable the shifting pinion to operate in a practical manner without disconnecting some driving connection or stopping the driving apparatus to reduce the effect of the thrust and grind when moving gears are brought into mesh. I overcome this objection by providing a shifting pinion made in two sections, one section being fixed to its shaft and the other section being loose and free to rotate in one direction independently of the fixed section. The two sections are provided with interlocking means, so that when rotating in the forward direction the fixed section will carry the loose section with it. The width of the pinion—that is, both sections together—is sufficient to bridge a space between the adjacent gear-teeth, so that the mesh of the pinion with the gear-wheels will never be broken in shifting to and from adjacent gears. The width of each half or section of the pinion, however, is narrower than the space between adjacent teeth or gear-wheels, so that one section cannot mesh simultaneously with the teeth of adjacent gears. The relative position of the two sections is such that in shifting from a low speed to a higher speed the fixed section will be in advance, and when shifting from a high speed to a lower speed the loose section will be in advance, so that in either event at the instant the adjacent gears are bridged the loose section will be in mesh with the gear having the higher surface speed.

A specific form of variable-speed driving-gear embodying my invention and which is adapted more particularly for bicycles consists of a pin-wheel secured to the rear wheel of the bicycle, a pinion, preferably in two parts, arranged to slide parallel with the face of the pin-wheel to change the driving connection, a driving-shaft to which said pinion or one member thereof, if made in two parts, is keyed, a bevel-pinion carried forward of the crank-shaft and through which said driving-shaft slides and to which said pinion is operatively connected by a spline, and a large driving bevel-gear mounted on the crank-shaft. The driving-shaft is shifted longitudinally to shift the sliding pinion by means of a lever pivoted at the lower part of the bicycle-frame and extending upward between the handle-bars. This shifting-lever is provided with a projection arranged to enter notches on an indicator or locking-plate secured on the upper tube of the frame. This indicator is provided with alternate notches indicating the different speeds for which the gear can be set, and between each notch is a "coasting-notch," the function of which will be explained hereinafter.

The specific form of driving-gear just referred to is illustrated in the accompanying drawings, in which—

Figure 2:
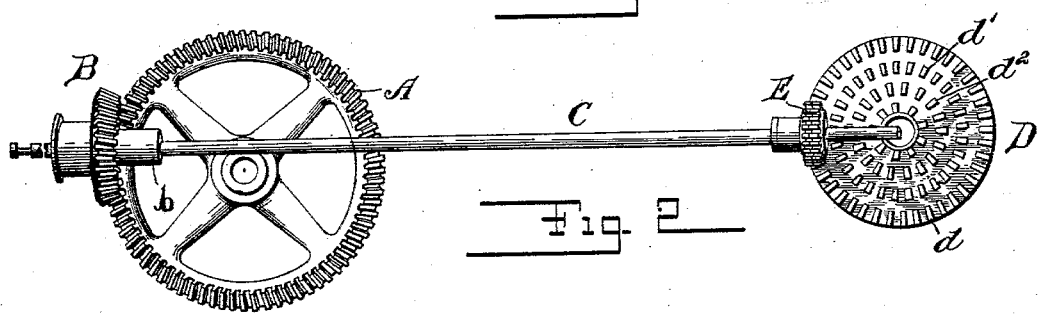
Figure 3:
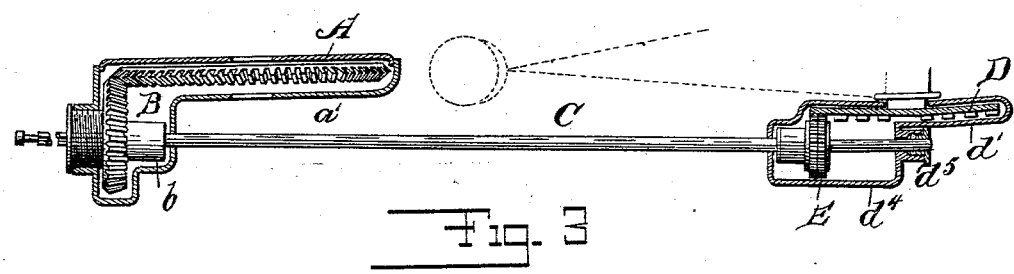

Figure 1 is an elevation of a bicycle; Figs. 2 and 3, plan views of the driving and driven gears; Fig. 4, a cross-section of the forward or bevel pinion and its ball-bearing; Fig. 5, a cross-section of the sliding rear pinion; Fig. 6, a cross-section on the line 6 6 of Fig. 5 looking to the left. Fig. 7 is a section of the bearing for the rear end of the driving-shaft; Fig. 8, a view of the indicating and locking device for the shifting-lever; and Figs. 9 and 10 sectional views corresponding to Figs. 5 and 6, showing a modified form of the shifting pinion.

Referring to the drawings, and particularly to Figs. 2 and 3, A indicates a bevel driving-wheel, which is secured to the crank-shaft *a* in any suitable manner, the shaft being mounted in suitable ball-bearings carried by casing *a'*, one-half of which, as shown in Fig. 1, is secured to and forms part of the frame of the machine. Wheel A drives bevel-pinion B, which is provided with a long hub $b$. This hub rotates in a ball-bearing mounted in casing $a'$, as shown in section in Fig. 4. In this view a screw-threaded sleeve $b'$ is screwed into a flange on casing $a'$ and carries two sets of balls separated by a flange $b^2$, the outer set being retained in position by retaining-collar $b^3$. It will be noticed that this ball-bearing in addition to serving as a journal-bearing for pinion B serves also as a thrust-bearing therefor in both directions. Hub $b$ is provided with a slot for a key or spline $b^4$ on the driving-shaft C, so that said shaft is free to slide within hub $b$ while maintaining a driving connection. Pinion B is preferably carried on the driving-shaft forward of the crank-shaft, since the power applied to the pedals can be much more effectively imparted to the gearing when arranged as shown, and the friction on the crank-shaft will be much less than when pinion B is placed back of the crank-shaft.

The driven gear of the variable-speed mechanism is a pin-wheel D, secured to the hub of the rear bicycle-wheel, and is protected by a casing $d^4$. As shown, wheel D is provided with four concentric sets of pins or teeth $d$, $d'$, $d^2$, and $d^3$, with which pinion E engages; but it will be understood that any desired number of sets of teeth may be employed. This pinion is keyed upon shaft C, so as to turn therewith and to partake of the longitudinal movements of the shaft to place it in mesh with either set of teeth on wheel D. The rear end of shaft C slides through a ball-bearing, the balls being in a rectangular raceway formed in a flange on casing $d^4$ and retained by collar $d^5$. The balls in this bearing reduce friction on shaft C both in rotation and longitudinal movement.

Pinion E may be made in one piece, so as to form a rigid driving connection; but in practice I prefer to make it in two parts $e$ and $e'$. (See Figs. 5 and 6.) Part $e$ is keyed to shaft C, provided with a sleeve $e^2$ and a ratchet-wheel $e^3$, which may be made integral with the pinion member $e$, or it may be a separate ring secured to the inner side of pinion $e$. Part $e'$ is provided with one or more pawls $e^4$, which are held in engagement with ratchet-wheel $e^3$ by springs, as shown in Fig 6. Part $e'$ also has a sleeve $e^5$, the internal diameter of which is greater than the external diameter of sleeve $e^2$. Between these sleeves is a light coiled spring $e^6$, one end of which is bent at a right angle and then downward to fit into a slot in sleeve $e^2$, as shown in Fig. 5, and the other end of this spring is free. The normal diameter of this spring is slightly larger than the internal diameter of sleeve $e^5$ and when inserted in sleeve $e^5$ produces a frictional engagement sufficient to turn pinion $e'$ backward when it is revolved forward in advance of pinion $e$. Sleeve $e^5$ has a bearing on sleeve $e^2$ at flange $x$ and ring $x'$, and the two members of the pinion are held together by collar $x^2$. In the normal operation of pinion E the teeth of parts $e$ and $e'$ are in alinement and pawls $e^4$ are in engagement with the teeth of ratchet $e^3$.

The driving-shaft C is shifted longitudinally to shift pinion E by means of lever F. This lever is pivoted at $f$ on the bicycle-frame and has an operating-handle which extends above the top of the frame between the handle-bars. Secured to the frame adjacent to lever F is a plate G, having seven notches, with which projection $f'$ on lever F engages to hold the lever, and hence driving-rod C and pinion E, in the adjusted position. A spring-arm $f^2$ extends partly around the tube to which plate G is secured, which allows projection $f'$ to move out of the notches and draws same into the notches as the lever is shifted along the plate. Notch number one is the low-speed position, the third and fifth notches the two intermediate-speed positions, and the seventh notch is the high-speed position. The second, fourth, and sixth notches are the coasting positions of the driving mechanism. When the shifting-lever is in either of these positions, pinion E, or part $e$, if a split pinion is employed, will stand between adjacent sets of teeth $d$ on the pin-wheel, and hence out of driving connection. When the split pinion is employed, part $e'$ will always be in mesh when coasting and the rotation of pin-wheel D will drive part $e'$, causing its pawls $e^4$ to travel around the ratchet $e^3$. It will be understood that the space between adjacent sets of teeth $d$ is a little less than the width of the teeth on pinion E when a split pinion is employed; but when a solid pinion is employed its teeth will be less in width than that space, so that the driving connection may be broken to permit coasting.

The operation of the variable-speed mechanism is as follows: The driving connection indicated is the low-speed connection, and to shift to the next higher speed lever F is moved forward one notch, which shifts member $e$ of pinion E between the adjacent teeth $d$ and $d'$; but the forward drive still continues through member $e'$ in this manner. Shaft C rotates member $e$, which is keyed thereto, and ratchet $e^3$, engaging pawls $e^4$, drives member $e'$, the teeth of which member being still in mesh with low-speed teeth $d$ continues to drive the wheel at low speed. The operator, however, continues the forward movement of lever F, and the teeth of member $e$ will slip into mesh with teeth $d'$ so soon as the teeth of $e$ and teeth $d'$ come into proper alinement, and when the projection on lever F is in notch 3 the teeth of member $e'$ will also have shifted into mesh with teeth $d'$. The mutilation of these teeth during the shifting operation is avoided, because member $e$ is rotating at a speed approximating the surface speed of teeth $d'$, and member $e'$ is free to rotate faster than $e$, due to the difference in surface speed between teeth $d$ and $d'$ on the pin-wheel. Therefore it will be seen that as the teeth of member $e$ pick up teeth $d'$ teeth $d$, due to the difference in surface speed, will run member $e'$ faster. During this movement pawls $e^4$ travel over ratchet-teeth $e^3$ and sleeve $e^5$ slips around on spring $e^6$. As the shifting movement continues and when the teeth of member $e$ are fully in mesh with teeth $d'$ the teeth of member $e'$ will be free between the adjacent sets of teeth $d$ an $d'$, and spring $e^6$ through its frictional engagement with the inner side of sleeve $e^5$ will turn member $e'$ backward a distance less than one ratchet-tooth $e^3$, or, in other words, until pawls $e^4$ positively engage ratchet-teeth $e^3$, when the teeth of member $e$ and $e'$ will be in alinement and moving together, so that the teeth of $e'$ will slip into mesh with teeth $d'$ at the end of the movement of lever F. To shift to the next higher speed, lever F is again moved forward, first into notch 4, which places member $e$ between teeth $d'$ and $d^2$ and then the teeth of both members $e$ and $e'$ into mesh with teeth $d^2$ as lever F is shifted to position 5. For high speed the same operation is performed, the lever being first moved to position 6, which disengages teeth $d^2$ and the teeth of $e$, and then to position 7, where the teeth of $e$ and $e'$ will be in mesh with the final set of teeth on the pin-wheel. To reduce speed, the shifting movements are performed in the reverse order. When the rider desires to "coast," shifting-lever F is moved to one of the notches 2, 4, or 6 and allowed to remain there. During this position, as above pointed out, member $e$ of pinion E will stand clear of the teeth of pin-wheel D, and said wheel will drive member $e'$, its pawls traveling over ratchet-teeth $e^3$ and sleeve $e^5$ slipping around on spring $e^6$. It will be understood that the rider can shift lever F to a coasting position regardless of the speed at which the machine is being driven and that the lever can be moved either forward or backward.

In the modification of pinion E (shown in Figs. 9 and 10) I provide members $e$ and $e'$ with interlocking ratchet-teeth $e^7$, which lock the two members when rotating in one direction and permit the members to rotate independently when member $e'$ only is in mesh or when the two members mesh with adjacent gears. In this form sleeve $e^5$ of member $e'$ is sleeved directly upon sleeve $e^2$ of member $e$ and spring $e^6$ is coiled around the outer surface of sleeve $e^5$. Retaining-collar $x^2$ is secured to sleeve $e^2$, and sleeve $e^5$ is shorter than in the pinion shown in Fig. 5, so as to leave a space between its end and collar $x^2$ and permit member $e'$ to slide back and allow ratchet-teeth $e^7$ to clear when the two members rotate independently of each other. In this form spring $e^6$ need not have one end secured, as in Fig. 5, since a backward movement of member $e'$ to bring the teeth of the pinion in alinement is not necessary, and hence spring $e^6$ is arranged to force member $e'$ against member $e$, the ratchet-teeth $e^7$ serving to place the teeth of the pinion in alinement.

What I claim is—

1. In a variable-speed gearing, the combination of two or more adjacent gears, a pinion divided transversely to its axis adapted to be moved into mesh therewith, means for shifting said pinion successively into and out of mesh with said gears, and means on said pinion for permitting independent rotation of its parts in making and breaking mesh with adjacent gears during the shifting movement, substantially as set forth.

2. In a variable-speed gearing, the combination of two or more adjacent gears, a pinion divided transversely to its axis adapted to be moved into mesh therewith, means for shifting said pinion successively into and out of mesh with said gears, and a ratchet connection between the parts of said pinion permitting independent rotation thereof in making and breaking mesh with adjacent gears during the shifting movement, substantially as set forth.

3. In a variable-speed gear, the combination of two or more adjacent gears of different diameters, a pinion divided transversely to its axis, means for shifting said pinion successively into and out of mesh with said gears of different diameters, and means on said pinion for permitting independent rotation of its parts in making and breaking mesh with adjacent gears during the shifting movement, substantially as set forth.

4. In a variable-speed gear, the combination of two or more adjacent gears of different diameters, a pinion divided transversely to its axis, means for shifting said pinion successively into and out of mesh with said gears of different diameters, and a ratchet connection between the parts of said pinion permitting independent rotation thereof in making and breaking mesh with adjacent gears during the shifting movement, substantially as set forth.

5. In a variable-speed gear, the combination of two or more adjacent concentric sets of gear-teeth, a pinion divided transversely to its axis, means for shifting said pinion successively into and out of mesh with said concentric gear-teeth, and means on said pinion for permitting independent rotation of its parts in making and breaking mesh with adjacent gears during the shifting movement, substantially as set forth.

6. In a variable-speed gear, the combination of two or more adjacent concentric sets of gear-teeth, a pinion divided transversely to its axis, means for shifting said pinion successively into and out of mesh with said concentric gear-teeth, and a ratchet connection between the parts of said pinion permitting independent rotation thereof in making and breaking mesh with adjacent gears during the shifting movement, substantially as set forth.

7. In a driving-gear for bicycles, the combination of a driving gear-wheel on the crank-shaft, a shaft driven thereby, a pinion on said shaft, meshing with said driving-gear in front of the crank-shaft, a pinion on the rear end of said shaft, a driven gear-wheel connected with one wheel of the bicycle and driven by said pinion, and means for adjusting said pinion, toward and away from the center of said driven gear-wheel to vary the speed of the latter, substantially as herein set forth.

8. In a driving-gear for bicycles, the combination of a driving gear-wheel on the crank-shaft, a shaft driven thereby, a pinion on said shaft, meshing with said driving-gear in front of the crank-shaft, a pinion on the rear end of said shaft, a driven gear-wheel connected with one wheel of the bicycle, and provided with two or more concentric sets of gear-teeth on one side thereof and with which said pinion is adapted to mesh successively, and means for shifting said pinion across the face of said driven gear-wheel to place it in mesh with any one of said concentric sets of teeth, substantially as herein set forth.

9. In a driving-gear for bicycles, the combination of a driving gear-wheel on the crank-shaft, a pinion meshing therewith, a driven shaft on which said pinion is mounted, a pinion divided transversely to its axis on said shaft, a disk connected with one wheel of the bicycle, and provided with two or more concentric sets of gear-teeth on one side thereof and with which said divided pinion is adapted to mesh successively, means for shifting said pinion successively into and out of mesh with said concentric gear-teeth, and means on said pinion for permitting independent rotation of its parts in making and breaking mesh with adjacent sets of gear-teeth during the shifting movement, substantially as herein set forth.

10. In a driving-gear for bicycles, the combination of a driving gear-wheel on the crank-shaft, a pinion meshing therewith, a driven shaft on which said pinion is mounted, a pinion divided transversely to its axis on said shaft, a disk connected with one wheel of the bicycle, and provided with two or more concentric sets of gear-teeth on one side thereof and with which said divided pinion is adapted to mesh successively, means for shifting said pinion successively into and out of mesh with said concentric gear-teeth and a ratchet connection between the parts of said pinion permitting independent rotation thereof in making and breaking mesh with adjacent sets of gear-teeth during the shifting movement, substantially as herein set forth.

11. In a driving-gear for bicycles, the combination of a driving-gear on the crank-shaft, a shaft driven thereby, a pinion on said shaft divided transversely to its axis, one member thereof being splined to the shaft, a driving connection between said members whereby the second member is free to rotate independently in one direction, a driven gear-wheel connected with one wheel of the bicycle, and provided with two or more concentric sets of gear-teeth on one side thereof and with which said pinion is adapted to mesh successively, said sets of teeth being separated by a space sufficient to allow the fixed member of the pinion to rotate without being in mesh with said teeth, and whereby the loose member while in mesh is free to rotate with the driven gear-wheel while the driving-shaft is held stationary, and means for shifting said pinion members successively into and out of mesh with said concentric gear-teeth, substantially as set forth.

This specification signed and witnessed this 4th day of November, 1901.

FRANZ MARKGRAF.

Witnesses:
WM. PELZER,
ANNA PELZER.